A. B. PETERSON.
Thrashing Machine.
No. 10,212.  Patented Nov. 8, 1853.
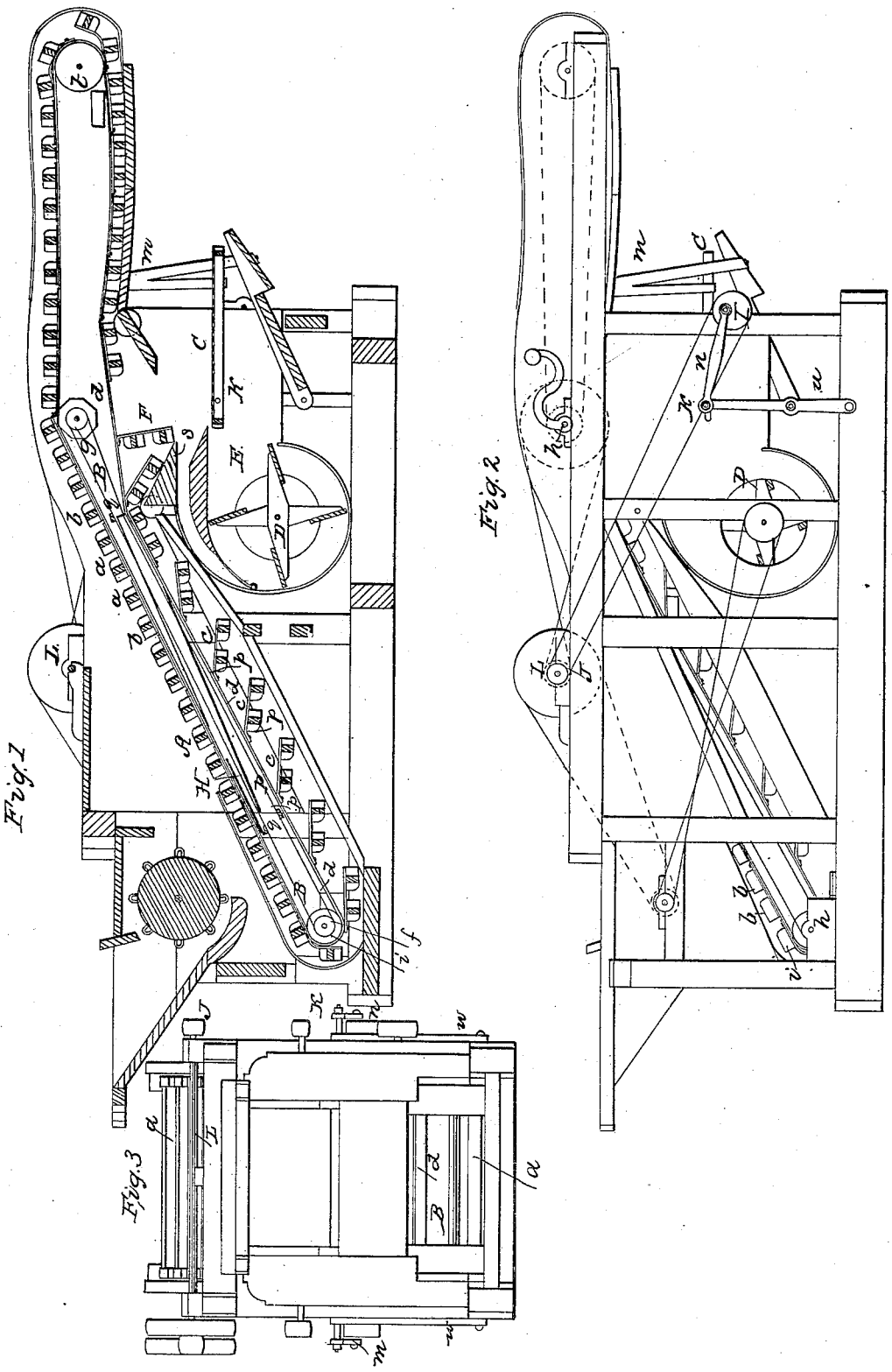

UNITED STATES PATENT OFFICE.

ABRAM B. PETERSON, OF DEXTER, MICHIGAN.

GRAIN THRESHER AND SEPARATOR.

Specification of Letters Patent No. 10,212, dated November 8, 1853.

*To all whom it may concern:*

Be it known that I, ABRAM B. PETERSON, of Dexter, in the county of Washtenaw and State of Michigan, have invented a new and useful Improvement in Machines for Separating and Cleaning Grain; and I do hereby declare that the following is a full, clear, and exact description of the construction and operation of the same, reference being had to the annexed drawings, forming part of this specification, in which—

Figure 1 is a vertical longitudinal section of the machine. Fig. 2 is a side elevation of the same. Fig. 3 is an elevation of the fore end.

Similar letters in the several figures refer to the same part of the machine.

The nature of my invention consists, 1st, in extending the raddle beyond the grain carrier, and dividing it into swinging sections (as will hereafter be described) which will close on the upper or rising surface of the belt, to which they are attached, and thus form a continuous raddle for carrying off the straw; and capable of opening when on the lower side of the belt, so as to offer no obstruction to the grain in falling from the carrier to the sieve of the mill; secondly, in so arranging the raddle and the grain carrier as to run them separately on different pulleys, for the purpose of regulating their relative speed; thirdly, in placing an apron of sheet iron or other suitable material between the raddle and grain carrier at the point where the grain and straw are received from the cylinder, for the purpose of protecting the grain carrier, and lastly, in constucting the grain sieve so as to have a horizontal reciprocating motion, it being operated by eccentrics driven by pulleys on the beater shaft.

In the drawings, A represents the raddle, B the grain carrier, C the sieve, and D the fan contained in the chamber E. The raddle A is composed of the sections F F, each consisting of two or more slats *a, a*, with heads *b, b*, which are fastened to the straps *c, c* attached at one end to the belts *d*, so that the sections on the upper portion of the belt, form a continuous raddle, while on the lower or return portion, the sections F revolve about the attachment of the straps *c, c* to the belt *d*, and assume a vertical position, leaving the space through which the grain falls to the mill, open, as seen in Fig. 1. These sections instead of being constructed with the slats *a*, may have wire meshes filling the space between the heads *b, b*.

The grain carrier B passes over the pulleys *f, f, g, g*, upon the shafts *h, h'*; the pulleys *f* being loose and upon the same shaft as the pulleys *i* carrying the raddle, they may however be placed upon a separate shaft if desired, the object being to render the velocities of the raddle and carrier independent of each other. Between the raddle A and the grain carrier B is the apron H, made of sheet iron or any suitable material, for the protection of the carrier from the abrading action of the grain and straw when thrown against it from the cylinder.

The mill consists of the fan D and sieve C, which latter is sustained in the rear by the shaft K, and suspended in front by the straps *m;* a horizontal reciprocating motion being given to it by means of the connecting rods *n* attached to the shaft K and the faces of the pulleys I between their centers and perimeters; motion being communicated by bands over the pulleys I and J, the latter on the beater shaft L.

The operation of my machine is as follows: The straw and grain after passing between the cylinder and concave in the usual manner are thrown upon the raddle A and protecting apron H, and the separation then comemnces; the raddle being shaken as it moves forward, by the ordinary cams under the belts *d*, and the grain and chaff falling upon the carrier B, which is carried forward with the same velocity as the raddle by properly regulating the speed of the pulleys *g*, the grain resting against the slats *q* upon the surface of the carrier. When the straw reaches the pulleys *t* over which the belts *d* pass, it is discharged; and as each section F passes over these pulleys, it revolves about the points of attachment *p* of the straps *c* and belts *d*, so that while the sections are passing over the sieve C they have a vertical position, permitting the grain discharged over the upper edge of the carrier B, to fall upon the sieve C, without lodging on the returning raddle, causing it to choke and be drawn back under the carrier, as would be the case if the raddle returned in its continuous form. After the sections have passed over the sieve, the guides *s* raise them, when they pass around the lower pulley *i* and again perform the above described functions.

The grain and chaff after leaving the carrier fall upon the sieve C, when the chaff is driven off by the fan blast in the usual manner, the sieve as before stated having a horizontal reciprocating motion by reason of the eccentric connection of the rods $n$ with the pulleys I.

The important feature of my invention consists in the construction of the raddle A, with the swinging sections F, for allowing a clear passage for the grain in falling from the carrier to the mill. I do not as I stated before confine myself to the use of the slats $a$ in constructing the sections, but propose to use wire meshes formed between the heads $b$, which are made to revolve about the attachment $p$ of the straps $c$ and belts $d$ as above described in the case of the slats.

The advantages of my separator are numerous and important. The construction of the raddle, moving independently without the carrier and furnished with the swinging sections F, which rest loosely upon the belts $d$ and assume a vertical position while passing over the sieve, separates the grain from the straw more effectually than any other machine, and at the same time prevents the choking which must take place when the raddle returns between the carrier and the sieve in the same continuous manner as it advances with the carrier. The loose manner in which the sections rest upon the belts $d$ permits a greater shaking of the raddle than is usual, and consequently causes an effectual separation of the grain from the straw.

The use of the apron H, which in no respect interferes with the operation of the machine, preserves the carrier from the great wear that would be caused by the grain and straw coming in contact with it on leaving the cylinder, and also prevents the long straw from being driven in between the raddle and carrier and deranging the apparatus.

The arrangement of the sieve is simple, effectual and economical, costing but one fifth the expense of ordinary sieves; it is moreover less liable to get out of order, and wears the frame less than where the shoe is used, this latter arrangement shaking the frame by its side movement and rapidly destroying it. The grain board or screen which requires but one third the motion of the sieve, receives by my arrangement the proper velocity instead of being driven at the same speed as is the case where the shoe is used. The operating of the sieve by pulleys on the beater shaft is I consider of great importance, as it allows the motion of the sieve to be regulated without interfering with the movement of the fan shaft, the usual manner of operating this portion of the machine being from pulleys on that shaft, an arrangement which all persons practically acquainted with machines of this character well know is exceedingly difficult to keep in order.

What I claim as my invention and desire to secure by Letters Patent, is—

1. The raddle A with swinging sections as described, in combination with the interior carrier or elevator B, to separate the grain from the straw and discharge the grain on the riddles under the head of the carrier or elevator B, with the effect of permitting the cylinder and concave to be set low down, the whole operating substantially as set forth.

2. The running of the raddle A and carrier or elevator B on separate and independent pulleys in the manner and for the purposes herein described.

3. The introduction of the protecting apron H between the carrier or elevator B and raddle A to serve the double purpose of preventing the straw from driving through the raddle A, and protecting the carrier or elevator B from abrasion by the grain, as herein fully set forth.

4. Hanging the riddles or the riddle and wheat board to upright standards $w$ as described, to give the upper riddle the longest stroke.

In testimony whereof I have hereunto signed my name before two subscribing witnesses.

ABRAM B. PETERSON.

Witnesses:
 GEO. PATTEN,
 JNO. OBER.